Nov. 14, 1967　　　YASUNOSUKE TORII　　　3,353,075
SAFETY DEVICE FOR DYNAMIC BRAKING OF ELECTRIC VEHICLES
Filed Dec. 16, 1963　　　　　　　　　　　　　　　4 Sheets-Sheet 1

Yasunosuke Torii
Murao Tanaka
INVENTORS

BY George B. Auyoroth
Attorney

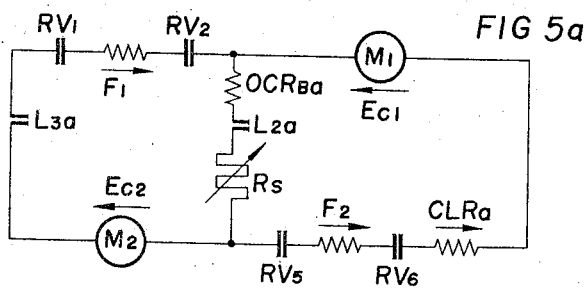
FIG 5a
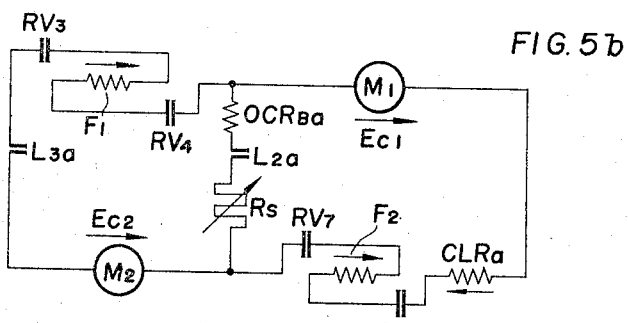
FIG. 5b
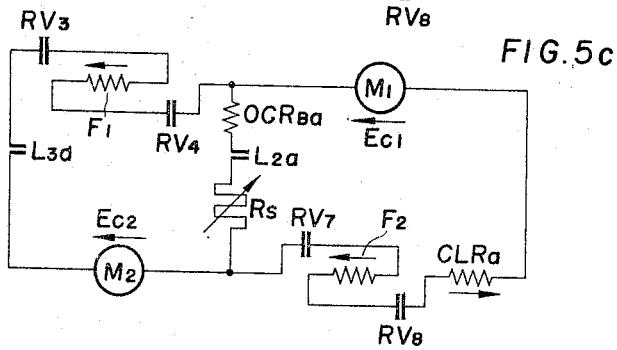
FIG. 5c
FIG. 6a
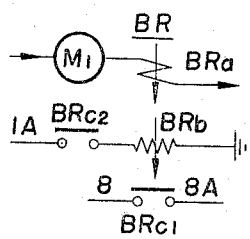
FIG. 6b
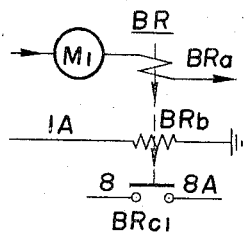

United States Patent Office 3,353,075
Patented Nov. 14, 1967

3,353,075
SAFETY DEVICE FOR DYNAMIC BRAKING OF ELECTRIC VEHICLES
Yasunosuke Torii and Murao Tanaka, Tokyo, Japan, assignors to Tokyo Shibaura Electric Co., Ltd., Kawasaki-shi, Japan, a corporation of Japan
Filed Dec. 16, 1963, Ser. No. 330,836
4 Claims. (Cl. 318—57)

This invention relates to a safety device for dynamic braking of electric trains, and more particularly to an improved safety device adapted to protect train driving motors against excessive current caused by misapplication of dynamic braking.

Electric trains for railways are usually composed by connecting a plurality of motor cars and trailer cars so as to control in unison all of the motor cars by means of a master controller provided for in the motor car at the head of the train. There is a problem in such an electric train composed of a plurality of cars, with regard to the uniform application of dynamic braking to all the cars.

The principal object of this invention is to provide a safety device for dynamic braking which can assure simultaneous application of dynamic braking to all electric cars included in an electric train.

Further objects and features will become apparent from the following description with reference to the accompanying drawings, in which.

Figure 1:
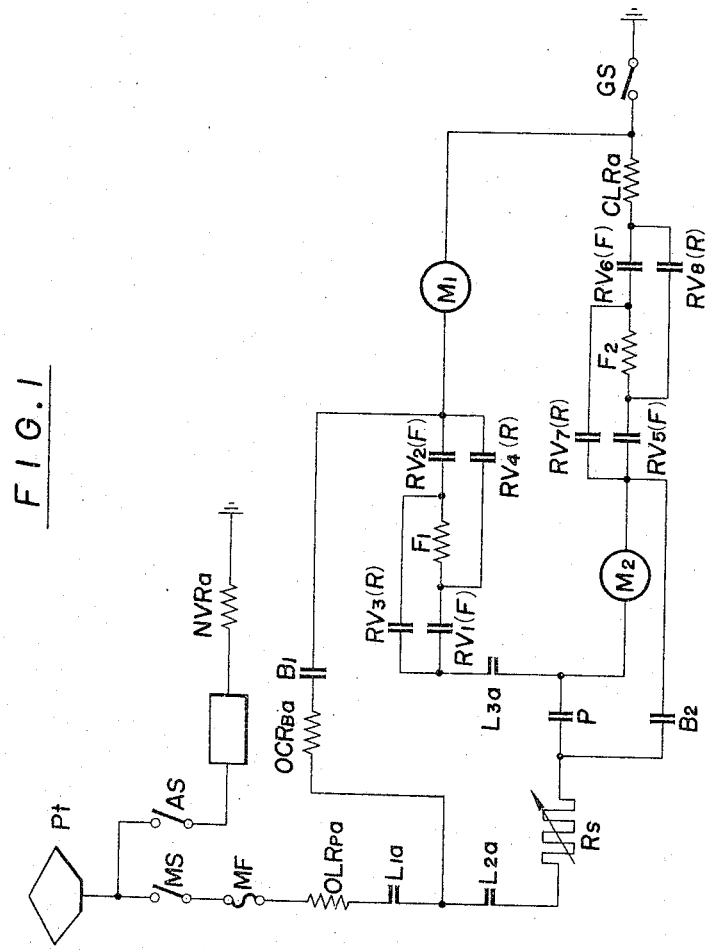
FIG. 1 is a connection diagram illustrating a typical connection of the main circuit of an electric car or train.

FIGS. 5a, 5b, and 5c show connections of the main circuit in three different conditions for dynamic braking; and FIGS. 6a and 6b show the connection of the essential portions of other embodiments of this invention.

Before describing in detail this invention it is believed valuable to describe the construction and operation of a dynamic braking system for a motor car or an electric train and the problems involved in such dynamic braking system.

The energizing circuit or main circuit for the driving motor of the respective motor cars usually includes a disconnecting switch, a fuse, an electric contactor adapted to connect and disconnect the motor to and from the trolley wire, a reversing switch, a contactor for changing the connection of the motor, a grounding switch and the like which are connected in series with the motor between the trolley wire and the ground for powering operation. Each group of these circuit components is provided for each motor car or for a group of two or more motor cars. Therefore when the fuse of the main circuit belonging to one group is blown out the remaining electric car belonging to that group will not contribute to powering but merely operate as a trailer dragged by another motor car. It is assumed that an electric train is scheduled to run from a point A towards a point B and then to run in the reverse direction. It is further assumed that during said initial run from point A to point B the powering circuits of all motor cars of said train are successively completed to accelerate and run the train and that the fuse of the powering circuit of one motor car is blown out so that said motor car becomes a trailer. When dynamic braking is applied to the train at the end of said powering a main braking circuit as shown in FIG. 5a will be completed for each motor car since the fuse is independent of the main braking circuit. For simplicity two electric motors each comprising armatures $M_1$, $M_2$ and series field windings $F_1$, $F_2$, respectively, are shown in the drawing. The armature $M_1$ is connected in series with the field winding $F_2$, while the armature $M_2$ is connected in series with the field winding $F_1$ and these series combinations are connected in parallel across a common variable braking resistor RS. As shown in the drawings the field windings $F_1$ and $F_2$ are connected in the circuit via the contacts $RV_1$, $RV_2$ and $RV_5$, $RV_6$, respectively, of reversers while the contact $L_{3a}$ of a contactor is included in circuit with the armature $M_2$. In circuit with the other armature $M_2$ is included a current responsive operating coil $CLR_a$ of a current limiting relay, and the braking resistor RS is connected in series with a braking contactor $L_{2a}$ and the coil $OCRB_a$ of an over current relay which operates to open said contactor $L_{2a}$ in case of over current. In the condition shown it is to be understood that the contacts $RV_1$, $RV_2$ and $RV_5$, $RV_6$ of said reverser are maintained in their closed positions to pass the current in the positive direction for effecting running from said point A to said point B. Upon applying dynamic braking the residual magnetism of the fields remaining after powering operation will induce in the armatures $M_1$ and $M_2$ voltages $EC_1$ and $EC_2$ as shown by the arrows to cause currents to flow in the direction indicated by arrows to assist building up of the magnetic flux in the field structure. It is to be noted that the current supplied to the braking resistor by the armature $M_1$ also flows through the coil $CLR_a$ of the current limiting relay in the direction indicated by the arrow in FIG. 5a.

The value of the operating current for the current limiting relay is set to provide the desired braking effect so that this relay will advance the notch of the resistor RS to decrease its resistance value when the braking current flowing through the relay decreases below said set value and stop to advance said notch when the braking current exceeds said set value thereby to provide substantially constant braking torque over a certain speed range. As will be described later, in order to improve the accuracy of notch advancing operation the current limiting relay is provided with a pick up coil which is arranged to be energized at an intermediate point between adjacent notches of the controller to cooperate with the coil $CLRa$ to open the notch advancing circuit. In the condition shown the current limiting relay assures satisfactory and safe braking operation by the cooperation of its two coils.

Next to be considered is the running condition of the train in the reverse direction after running from the point A to the point B. In this case as it is required to reverse the direction of rotation of the electric motors the reverser will be operated to reverse the current flowing through the field windings $F_1$ and $F_2$. FIG. 5b shows the main circuit for dynamic braking which will be completed after the powering operation in said reverse direction. As will be clearly noted from this figure the contacts $RV_3$, $RV_4$ and $RV_7$, $RV_8$ are closed to connect the field windings $F_1$ and $F_2$ in the reverse direction as that shown in FIG. 5a with respect to the armatures $M_1$ and $M_2$. However as mentioned above if the fuse in the main powering circuit has been blown out during the movement from the point A to the point B, the particular electric car including said blown out fuse does not receive power. As a result the residual magnetism of the fields $F_1$ and $F_2$ will remain unchanged from that created during the previous running from the point A to the point B, which will induce electromotive forces in the armatures $M_1$ and $M_2$ in the direction opposite to that of FIG. 5a because the connection of the field windings has been reversed and direction of rotation of the armatures has also been reversed from that in the previous running. Hence braking current will flow in the braking circuit in the direction indicated by arrows in FIG. 5b. It is particularly pointed out that the direction of the current flowing through the coil CLRa of the current limiting relay is opposite to that shown in FIG. 5a. If the correct power operation were effected during reverse running from the point B to the point A the polarity of the residual magnetism of the fields would be determined by the flow of said power current to cause braking current to flow in the braking circuit as shown in FIG. 5c. In this case the direction of current flowing through the current limiting relay is the same as in FIG. 5a.

Thus, failure of proper power operation will cause current to flow through the coil CLRa of the current limiting relay in the reverse direction during braking, as shown in FIG. 5b, so that the electromagnetic force of said coil will operate in the opposite direction from that of the pick up coil. This will increase the value of current at which the current limiting relay operates thus disenabling the notch control. Accordingly the controller will experience incorrect notch advance thus causing excessive braking current, unsatisfactory rectification, flash over and burn out of the motor.

For the purpose of preventing these troubles mentioned above, it is highly desirable to prevent dynamic braking circuit from being completed in case when no powering operation was effected during the previous running period. In order to meet this requirement, a safety system has been proposed wherein the line contactor adapted to connect the main circuit of the motor to the source of supply through the trolley wire is provided with an auxiliary contact arranged to close and open concurrently with the closure and opening of said line contactor to actuate an electric relay so as to confirm the powering operation. This relay is constructed such that once operated it will be held in its operated position so that it will not reset even after the line contactor has been opened to stop the powering operation. The normal open contact of this relay is connected in series with the closing circuit of a braking contactor so as to close the braking circuit only when the powering operation has been made.

Figure 2:
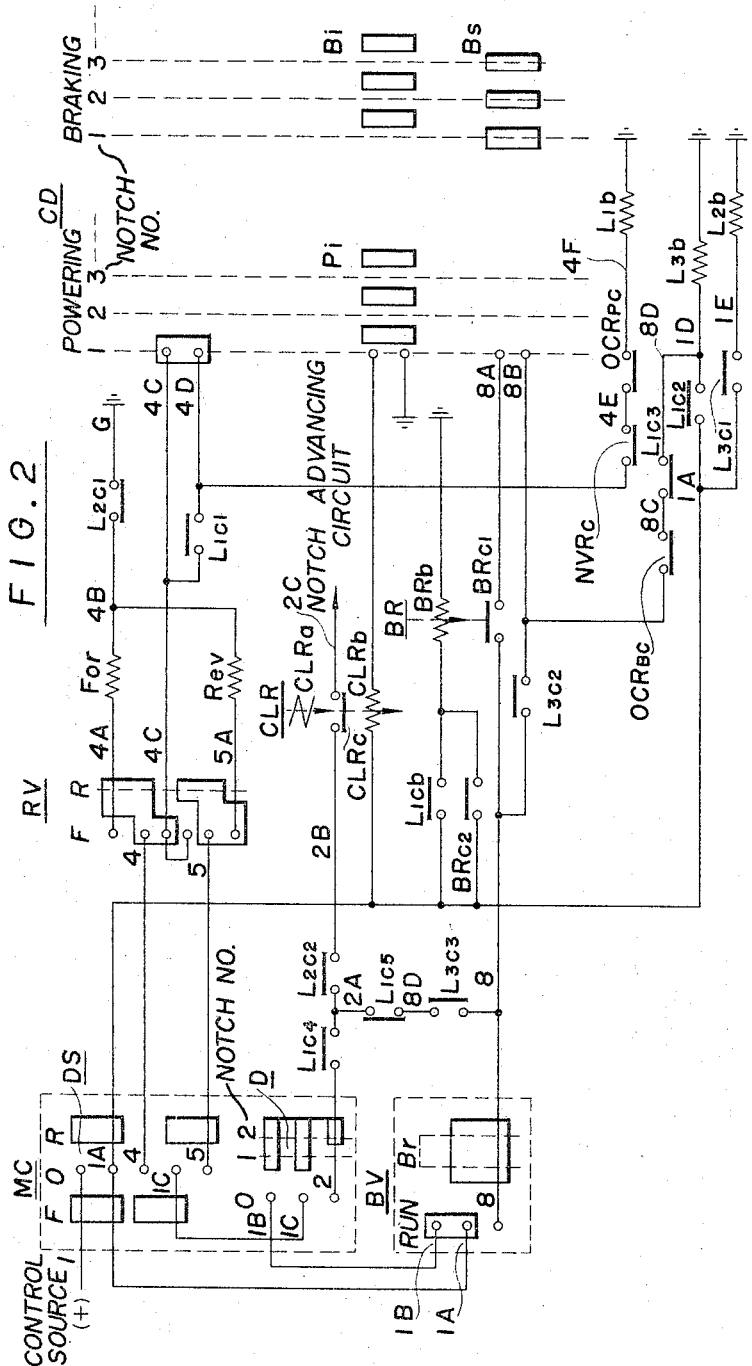
FIG. 2 is a connection diagram of the control device for an electric car provided with a prior art safety device for dynamic braking.

The above described prior art device will now be considered in connection with the main circuit shown in FIG. 1 and the control circuit shown in FIG. 2, corresponding components thereof being designated by the same reference characters as in FIG. 5. Referring to FIG. 1 one terminal of the main circuit is connected to the trolley wire, not shown, via a pantograph Pt, a disconnecting switch MS, a main fuse MF, the coil OLRpa of an over current relay, line contactors $L_{1a}$ and $L_{2a}$, a starting resistor RS (employed as the braking resistor during braking) and a powering contactor P while the other terminal of the main circuit is grounded via a grounding contactor GS. $B_1$ and $B_2$ indicate braking contactors connected to be closed during dynamic braking. Also, the references F and R labelled at the right-hand side of the contacts $RV_1$ and $RV_8$ represent "Forward" and "Reverse," respectively.

In order to provide multiple control of the electric train including a plurality of motor cars a main controller MC including a direction selector DS having three positions of F (forward), O (off) and R (reverse) and a control drum D having an off position O and two notch positions, "NOTCH NO." 1 and 2 as shown in FIG. 2 is mounted in the drivers cabin of the foremost car. Also a braking valve adapted to actuate an air braking system is mounted in said drivers cabin, said braking valve including an electric contact BV (hereinafter will be designated as the braking valve) having two positions, viz. a non-braking position on the operating position RUN and the other position at which the electric braking or dynamic braking Br is applied (one of said positions being an overlap position with regard to air braking). The control circuit to be described in detail later is provided for each car or a group of two cars and is connected in parallel with the main controller MC and the braking valve BV through train wires. For the sake of brevity, however, only one control circuit is shown in the drawings.

As shown in FIG. 2, in the control circuit are included a reverser RV and a controller CD having powering and dynamic braking notches. The reverser RV is provided with an operating coil "For" arranged between the conductor 4A and the ground G through the conductor 4B and the Contact $L_{2c1}$ for positioning said reverser RV directed to its forward as well as another operating coil "Re" arranged between the conductor 5A and the ground G through the conductor 4B and the contact $L_{2c1}$ for positioning said reverser RV directed to its reverse position. It is noted that the operating coils "For" and "Rev" are selectively energized from the control source as fast as said reverser is positioned as known by those skilled in the art. While the controller CD is shown schematically, actually it includes an operating motor which is arranged to be intermittently energized and deenergized under the control of the contact CLRc of a current limiting relay CLR to rotate stepwise the drum along the notches "NOTCH NO." 1, 2, 3, . . . during powering and dynamic braking operations thereby to sequentially short circuit the successive sections of the resistor RS (FIG. 1) connected in the powering circuit or dynamic braking circuit. In addition, the control circuit includes a relay BR to detect or confirm powering, closing coils $L_{1b}$, $L_{2b}$ and $L_{3b}$ for line contactors $L_{1a}$, $L_{2a}$ and $L_{3a}$ (FIG. 1) respectively and various auxiliary contacts.

Assuming now that the braking valve BV is positioned to the running position, the direction selector DS of the main contactor MC to the forward position and the controller drum D is manually advanced to the notch "NOTCH NO." 1, then when the reverser RV is in its forward position as shown in FIG. 2 and the controller CD is in the first notch "NOTCH NO." 1 of powering, a circuit will be completed from the positive side of the control source to the ground through conductors 1, 1A, 1B, 1C, 4, 4C and 4D, the normal close contact NRVc of an under voltage relay UVRa, FIG. 1, a conductor 4E, a normal close contact OCRPc of the over current relay, a conductor 4F and the closing coil $L_{1b}$ to close the line contactor $L_{1a}$ shown in FIG. 1. Then the normal open auxiliary contact $L_{1c1}$ of the line contactor $L_{1a}$ will be closed to interconnect conductors 4C and 4D to complete a holding circuit for the closing coil $L_{1b}$. Closure of the line contactor $L_{1a}$ will result in the closure of its auxiliary contact $L_{1c2}$ to complete an energizing circuit for the closing coil $L_{3b}$ which can be traced from the positive terminal of the control source to the ground through the conductors 1 and 1A, the contact $L_{1c2}$ and the coil $L_{3b}$, thus closing the line contactor $L_{3a}$ shown in FIG. 1. Concurrently therewith the auxiliary contact $L_{3c1}$ of the contactor $L_{3a}$ will be closed to energize the closing coil $L_{2b}$ through conductors 1A and 1E to close the line contactor $L_{2a}$ shown in FIG. 1. As is well known in the art the powering contactor P shown in FIG. 1 is closed when powering operation is selected.

Figure 4:
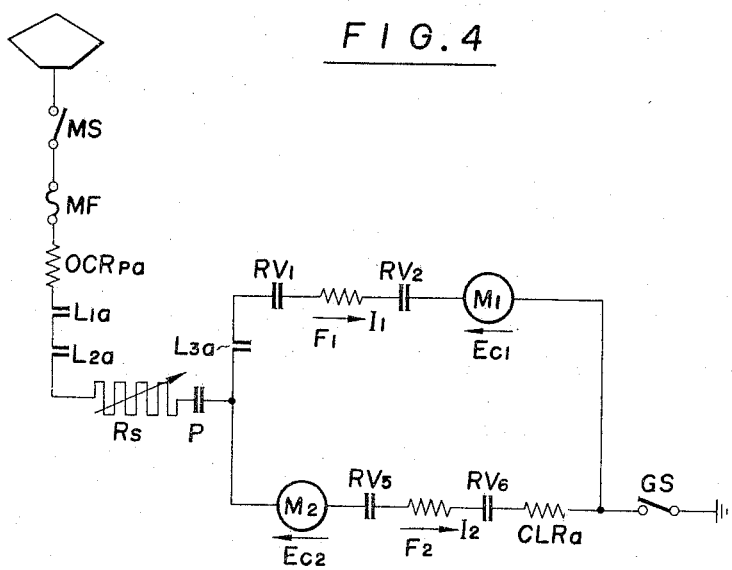
FIG. 4 shows the connection of the main circuit for powering.

In this way the powering circuit schematically shown in FIG. 4 is completed to start the electric train. However, advance of notches does not occur. When the control drum D of the main controller MC is advanced to the second notch "NOTCH NO." 2 the conductor 2 will be energized from the positive side of the control source via conductors 1B, 1A and 1 to energize a conductor 2B through serially connected normal open auxiliary contacts $L_{1c4}$ and $L_{2c2}$ of the line contactors $L_{1a}$ and $L_{2a}$, respectively. The conductor 2B will energize a conductor 2C leading to the operating motor of the controller CD (notch advancing circuit) through the contact CLR$c$ of the current limiting relay CLR. In addition to the coil CLR$a$ connected in circuit with the armature $M_2$, the current limiting relay CLR includes a pick up coil CLR$b$ which acts cumulatively to the coil CLR$a$. The coil CLR$b$ is arranged to be periodically energized between the conductor 1A and the ground via contacts P$i$ and B$i$ which are closed at an intermediate point between adjacent notches of the controller CD.

Thus, as the main controller MC is advanced to the second notch, notch advancing is effected under the control of the current limiting relay CLR to successively short circuit sections of the starting resistor RS thereby to accelerate the driving motors. More particularly, at each notch the current limiting relay CLR will open its contact CLR$c$ to stop notch advancing of the controller so long as the armature current flowing through its coil CLR$a$ exceeds a predetermined value but close said contact CLR$c$ to advance the controller CD when the armature current is decreased below said predetermined value thereby to accelerate the motor while limiting the armature current to said predetermined value.

When the line contactor shown in FIG. 1 is closed during powering operation, its normal open auxiliary contact $L_{1cb}$, FIG. 2, will be closed to complete the energizing circuit for the operating coil BR$b$ of the powering confirming relay BR between the conductor 1A and the ground to close its contacts $BR_{c1}$ and $BR_{c2}$. Closure of the contact $BR_{c2}$ will establish a holding circuit for the relay BR around the contact $L_{1cb}$. Thus the relay BR continues to close its contact $BR_{c1}$ even after the line contactor $L_{1a}$ is open together with its contact $L_{1cb}$ during coasting subsequent to powering. Accordingly the relay BR is deenergized to reset only when the direction selector DS of the main controller MC is moved to its off position when it is switched from forward position to reverse position to reverse the direction of the train.

When the control drum D of the main controller MC is moved to the off position after completing powering operation in the forward direction as above described the connection between conductors 1B and 1C will be interrupted to deenergize conductors 4, 4C, 4D, 4E and 4F so that the closing coil $L_{1b}$ will be deenergized to open the line contactor $L_{1a}$. Concurrently with the openbing of the contactor $L_{1a}$, its auxiliary contact $L_{1c2}$ will be opened to deenergize the coil $L_{3b}$, thus opening the line contactor $L_{3a}$. Opening of the contactor $L_{3a}$ will result in the opening of its auxiliary contact $L_{3c1}$ to deenergize the coil $L_{2b}$, thus opening the line contactor $L_{2a}$. Thus the powering circuit is interrupted and thereafter the electric train will coast.

For applying dynamic braking the braking valve BV is moved from its running position to its braking position. Then the conductor 8 will be energized from the positive terminal via conductors 1 and 1A. Since the contact $BR_{c1}$ of the relay BR is closed the conductor 8A will also be energized from said positive terminal. When the controller CD is moved to the first notch of braking, as the conductors 8A and 8B are interconnected by a contact B$s$ the coil $L_{3b}$ will be energized to close the contactor $L_{3a}$ by an energizing circuit including the normal close contact $OCRB_c$ of the over current relay, normal close contact $L_{1c3}$ of the line contactor $L_{1a}$ and conductors 8C, 8D, and 1D. Closure of the line contactor $L_{3a}$ will result in the closure of its auxiliary contact $L_{3c1}$ to interconnect contactors 1A and 1E thereby to energize the coil $L_{2b}$ for closing the contactor $L_{2a}$ simultaneously therewith the auxiliary contact $L_{3c2}$ is closed and the contactor $L_{3a}$ is self-maintained. It is to be understod that prior to these operations or concurrently therewith the powering contactor shown in FIG. 1 is opened and braking contactors $B_1$ and $B_2$ are closed, thus completing the braking circuit as schematically shown in FIG. 5$a$ by a suitable control circuit not shown.

During braking the circuit operates as follows: During braking, inasmuch as the normal open auxiliary contact $L_{3c3}$ of the contactor $L_{3a}$, the normal close auxiliary contact $L_{1c5}$ of the contactor $L_{1a}$ and the normal open auxiliary contact of the contactor $L_{2a}$ are all closed to interconnect conductors 8 and 2B through the contact $L_{3c3}$, conductor 8D, contact $L_{1c5}$, conductor 2A and contact $L_{2c2}$, the notch advancing circuit will be connected to the positive terminal of the control source through the contact $CLR_c$ of the current limiting relay CLR and the conductor 2C. So long as the current flowing through the braking circuit is below a predetermined value the current limiting relay CLR will close its contact $CLR_c$ to permit the controller CD to advance to the next notch to short circuit one section of the resistor RS in the braking circuit to increase the braking current. Whereas when the current exceeds said predetermined value the contact $CLR_c$ will be opened to stop notch advancing. Thus, the notch advancing is effected to provide uniform braking torque over a certain speed range. As mentioned hereinabove the contact B$i$ positioned between adjacent notches of the controller CD will energize the pick up coil $CLR_b$ of the current limiting relay CLR between adjacent notches. This pickup coil operates to assist the coil $CLR_a$ connected in the braking curcuit to positively pick up the contact $CLR_c$ of the current limiting relay CLR to advance notches step by step.

In the control circuit shown in FIG. 2 the relay BR which acts to confirm powering is connected to pick up by the closure of the normal open auxiliary contact $L_{1cb}$ of the line contactor $L_{1a}$ which is shown in FIG. 1 and arranged to be closed during powering thereby to interconnect conductors 8 and 8A in the energizing circuit for the operating coils $L_{2b}$ and $L_{3b}$ of contactors $L_{2a}$ and $L_{3b}$, respectively, which complete the braking circuit. However, by this circuit arrangement, irrespective of whether powering was actually made or not, the relay BR would be operated by the closure of the line contactor $L_{2a}$ so as to judge that powering was made. Therefore, in case of such fault as blow out of the fuse MF, the relay would misjudge that the powering was made although it was not made actually. Upon such a fault the polarity of the current flowing through the coil $CLR_a$ of the current limiting relay CLR during dynamic braking will not coincide with that of the pick up coil $CLR_b$ so that these coils will operate differentially at an intermediate point between adjacent notches resulting in the lowering of the set value of the current of the current limiting relay which will cause mis-notch, excessive braking current and burn out of the driving motors.

Therefore, the principal object of this invention is to eliminate the above mentioned defect of the prior art control device and to provide an improved safety device which can effectively protect the motor during dynamic braking.

Further object of this invention is to provide an improved safety device which renders ineffective dynamic braking when powering was not actually made.

Still further object of this invention is to provide a safety device for dynamic braking comprising a relay which, in response to the terminal voltage or current of a driving motor during powering, confirms whether or not powering was actually made.

Briefly stated, the safety device embodying this invention comprises at least one electric motor, means to connect said motor to a trolley wire during powering operation, means to disconnect said motor from a powering circuit and connect it to a dynamic braking circuit and means to permit to apply dynamic braking in response to the terminal voltage or energizing current of said motor during powering operation.

Figure 3:
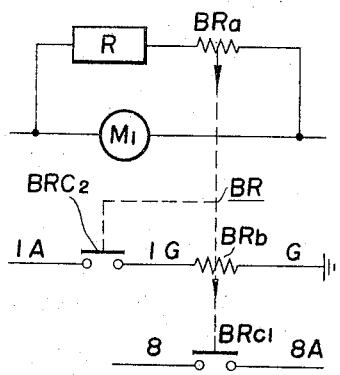
FIG. 3 is a connection diagram of the essential portion of one example of the dynamic braking safety device of this invention.

This invention will be described hereunder with reference to FIG. 3 wherein portions corresponding to those shown FIGS. 1 and 2 are designated by the same reference numerals which schematically illustrates the essential components of one embodiment of this invention. In FIG. 3 is shown only one armature $M_1$ of one particular motor among a number of driving motors of an electric train. It is to be understood that this armature is to be connected in the powering circuit as shown in FIG. 1 for running the electric train and in the braking circuit as shown in FIG. 5 to act as an generator for converting the running energy of the electric train into electric energy to decelerate the train. FIG. 3 shows the motor as connected in the powering circuit. The operating coil $BR_a$ of a powering confirming relay BR is connected across the armature $M_1$ in series with a current limiting resistor R. According to this invention the relay BR shown in FIG. 3 is used in the dynamic braking control circuit instead of the relay BR shown in FIG. 2 and includes a normal open contact $BR_{c1}$ adapted to interconnect conductors 8 and 8A when operated. Further, as shown in FIG. 3 the relay BR is provided with a holding coil $BR_b$ which holds the relay BR in its actuated condition even after powering operation is over. The holding coil $BR_b$ is connected between a grounding conductor G and a conductor 1G which is arranged to be connected with a conductor 1A shown in FIG. 2, when the contact $BR_{c2}$ is closed.

As will be obvious from FIG. 3 when a powering current actually flows through the motor to start and accelerate it there will appear a counter electromotive force across the terminals of the motor armature which increases gradually in response to acceleration. In response to a predetermined value of said terminal voltage the relay BR will operate to close its contact $BR_{c1}$. As already pointed out, since this relay is of the self holding type it will continue its operation even after the motor has been cut off from the trolley wire to coast. Therefore, when the braking valve BV shown in FIG. 2 is subsequently brought to the braking notch dynamic braking will be immediately applied. In this case, since dynamic braking is applied subsequent to powering operation the polarities of the coil $CLR_a$ and of the pick up coil $CLR_b$ are the same so that notches can be advanced successfully.

However, when powering operation was not effected during running in one direction due to blow out of the fuse MF, the armature $M_1$, FIG. 3, will not produce any back electromotive force so that the relay BR will not be operated. Therefore, during running of the electric car the powering confirming circuit through conductors 8 and 8A will not be completed. By this reason, even if the driver tries to apply electric braking subsequent to powering or coasting, the dynamic braking circuit will not be completed since contactors $L_{2a}$ and $L_{3a}$ (see FIG. 1 or FIG. 4) controlled by said conductors 8 and 8A do not close. Thus, it is able to positively prevent such faults as excessive current flow through the braking circuit and hence burn out of driving motors due to misoperation of the current limiting relay. Moreover, since in accordance with this invention dynamic braking is applied after confirming the fact that powering was actually effected it is able to provide more accurate safety device for braking than prior device as shown in FIG. 2 without such confirming device.

Although in the above described embodiment a relay responsive to the terminal voltage of an armature was utilized, the object of this invention can also be attained by utilizing a relay BR, FIG. 6a, wherein portions corresponding to those shown in FIG. 3 are designated by the same reference numerals which is the same as the relay BR shown in FIG. 3 except that a coil BRa which responds to the armature current is used. The coil BRa may pass the whole or a portion of the armature current or may be energized by it through a suitable direct current transformer. FIG. 6b wherein portions corresponding to FIG. 3 are designated by the same reference numerals illustrates modification of FIG. 6a wherein the self holding contact $BR_{c2}$ is omitted so that coils BRa and BRb operate cumulatively to close the contact $BR_{c1}$ thereby to hold it in the closed state during coasting by the electromotive force of the coil BRb. Although not shown in the drawings, in a control device including a field weakening contactor as in the conventional motor control device it is able to properly shunt the field winding of the driving motor to nullify or substantially decrease the braking force at the time when the relay detects abnormal condition.

As will be clear from the description hereinabove explained, this invention provides safety device for dynamic brake which can not only assure application of safe and positive dynamic braking but also protect the motor from excessive braking current by providing means which confirms the polarity of the residual magnetism of the motor field when applying dynamic braking subsequent to powering operation.

While the invention has been described in connection with some preferred embodiments thereof it should be understood that this invention is not limited thereto but may be varied in various ways without departing from the true spirit and scope of the invention as defined in the appended claims.

What is claimed is:
1. A safety device for dynamic braking of an electric car comprising
    at least two driving electric motors for driving said car,
    a powering contactor means to connect said motors to a power source and to complete a powering circuit during powering of said car,
    a braking contactor means to separate said electric motors from said powering circuit to complete a dynamic braking circuit for said electric motors only during braking of said car,
    a braking resistor connected to said electric motors,
    said dynamic braking circuit energizing the field winding of one of said motors, respectively functioning as generators, by braking current caused to occur by the other of said motor and to flow through said braking resistor,
    and a power confirming relay means connected to at least one of said motors to confirm and store the energization of said motors in switch-over operation from powering to braking of said car,
    said braking contactor means being energized through a contact of said power confirming relay means to act to complete said dynamic braking circuit in said switch-over operation.
2. The safety device for dynamic braking of an electric car according to claim 1 wherein said power confirming relay means is connected in parallel to either one of said motors.
3. The safety device for dynamic braking of an electric car according to claim 1 wherein said power confirming relay means is connected in series to either one of said motors.
4. The safety device for dynamic braking of an electric car according to claim 1 wherein said dynamic braking circuit is provided with a current-limiting relay means energized by the braking current and controlling the resistance of said braking resistor to maintain the braking current at a predetermined value.

References Cited

UNITED STATES PATENTS

| | | | |
|---|---|---|---|
| 850,211 | 4/1907 | Case | 318—478 X |
| 1,077,802 | 11/1913 | Case | 318—547 |
| 2,669,679 | 2/1954 | Purifoy | 318—383 X |
| 2,721,968 | 10/1955 | Brown | 318—269 |
| 2,807,770 | 9/1957 | Lichtenfels | 318—383 X |

BENJAMIN DOBECK, *Primary Examiner.*

O. L. RADER, *Examiner.*